May 1, 1951 O. R. STEPHENSON 2,551,347
VACUUM HYDRAULIC SUSPENSION SYSTEM
Filed March 24, 1944 4 Sheets-Sheet 1

INVENTOR.
Orley R. Stephenson
BY
Paul D. Fuhr
ATTORNEY

May 1, 1951 — O. R. STEPHENSON — 2,551,347

VACUUM HYDRAULIC SUSPENSION SYSTEM

Filed March 24, 1944 — 4 Sheets-Sheet 2

INVENTOR.
Orley R. Stephenson
BY
Paul A. Fisher
ATTORNEY.

May 1, 1951 — O. R. STEPHENSON — 2,551,347
VACUUM HYDRAULIC SUSPENSION SYSTEM
Filed March 24, 1944 — 4 Sheets-Sheet 3
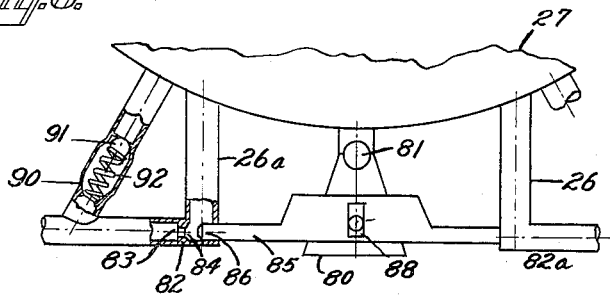
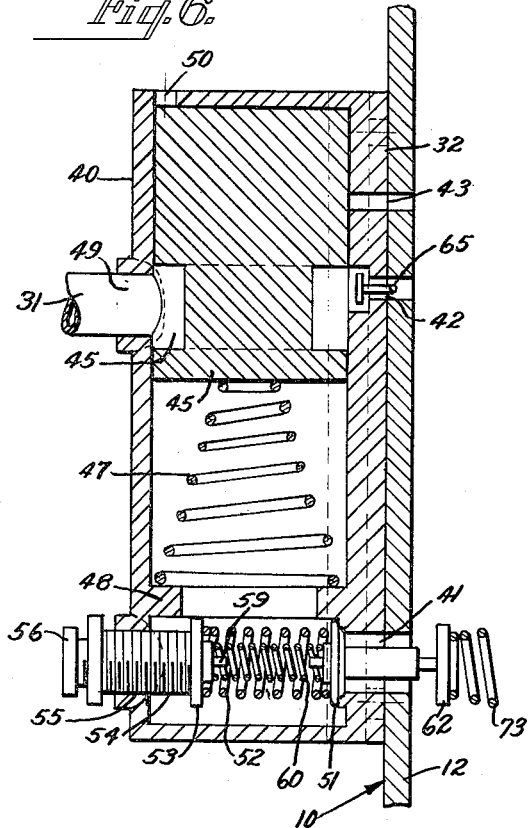
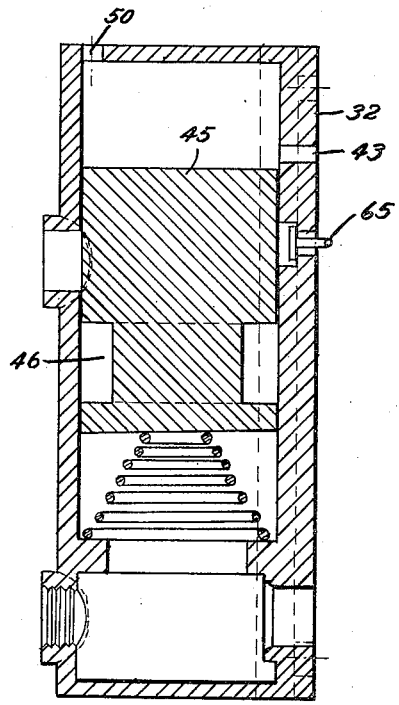
INVENTOR.
Orley R Stephenson
BY
Paul D. Fluhr
ATTORNEY.

May 1, 1951 — O. R. STEPHENSON — 2,551,347
VACUUM HYDRAULIC SUSPENSION SYSTEM
Filed March 24, 1944 — 4 Sheets-Sheet 4
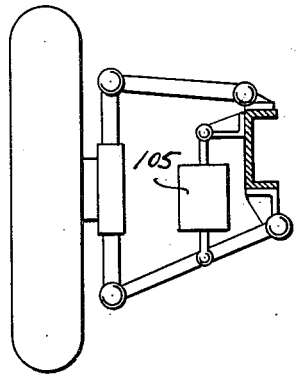
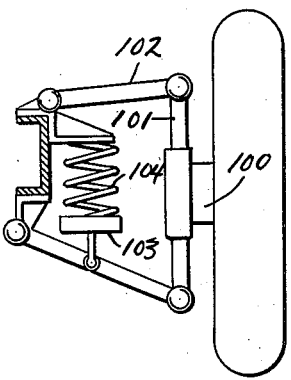
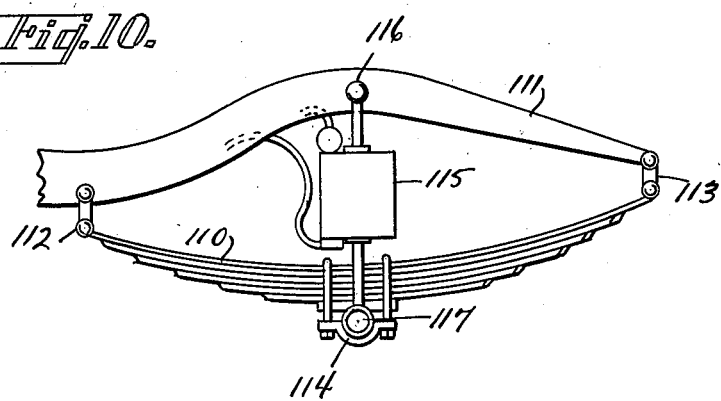
INVENTOR.
Orley R. Stephenson
BY
ATTORNEY.

Patented May 1, 1951

2,551,347

UNITED STATES PATENT OFFICE 2,551,347

VACUUM HYDRAULIC SUSPENSION SYSTEM

Orley R. Stephenson, Oakland, Calif.

Application March 24, 1944, Serial No. 527,880

3 Claims. (Cl. 267—64)

This invention relates generally to a suspension system for use in connection with automobiles, trucks, and other vehicles.

The conventional vehicle is suspended upon springs mounted at two or more points. It has been found that some form of control or snubbing action is necessary in addition to the springs and various types of snubbers and shock absorbers have been applied with varying degrees of success. Various pneumatic and hydraulic mountings have been used but have been unsatisfactory.

It is an object of the present invention to provide a new type of suspension device which may be used either alone or in conjunction with conventional suspension systems in which case it will take the place of the conventional snubber or shock absorber.

It is another object of the invention to provide a type of suspension system making use of vacuum which may be created by the vehicle itself.

It is a further object of this invention to provide a type of suspension device which will control both upward and downward movement of the frame with respect to the axle.

It is a further object of this invention to provide a suspension device which controls the swaying of vehicles from one side to the other while being driven around a curve and also the tilting of the vehicle when traveling on a sideling road.

It is a further object of the invention to provide a suspension system which may be adjusted to take care of predetermined weight conditions, etc.

The foregoing and other objects are attained in the embodiments of the invention illustrated in the accompanying drawing.

Referring to the drawing:

Figure 1 is a cross-sectional view of my vacuum-hydraulic suspension device.

Figue 2 shows the incorporation of my device upon the conventional automobile.

Figure 6 is a cross-sectional detail taken along the line 6—6 of Figure 4 and showing said valve in one operating position.

Figure 7 is a cross-section taken along the line 6—6 of Figure 4 and showing said valve in another operating position.

Figure 8 shows a pendulum valve arrangement which may be used in connection with my device.

Figures 9 and 9a illustrate the manner in which my device may be used in the conventional link parallelogram suspension system.

Figure 10 shows my device used in conjunction with a conventional semi-elliptic spring.

Figure 1:
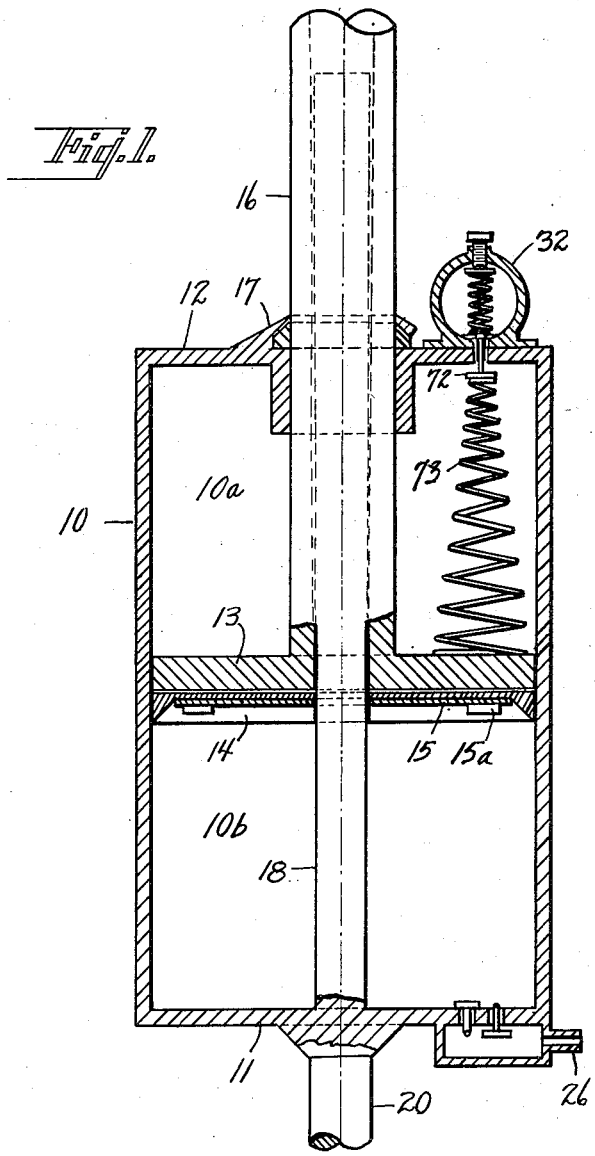

As shown in Figure 1 my device consists generally of a cylinder 10 having closed ends 11 and 12. I have provided a piston 13 which is slidably mounted within cylinder 10 and divides the same into enclosed areas 10a and 10b. Piston 13 is machined to fit snugly within cylinder 10 in such a manner that a liquid-proof seal is obtained therebetween. To aid in assuring this liquid-proof seal I have provided a packing 14, of suitable packing material, in the form of an inverted cup adjacent the lower surface of piston 13. The periphery of packing 14 is adapted to fit snugly against the inner wall of cylinder 10 to prevent the passage of liquid between areas 10b and 10a and yet to allow free movement of piston 13 within cylinder 10. The packing 14 may be affixed to piston 13 in any suitable manner but I have shown the same attached to piston 13 by means of plate 15 and bolts 15a, for example.

Piston 13 is rigidly affixed to a connecting rod 16 which extends through the upper wall 12 of cylinder 10 and terminates in a pivotal connection as will hereinafter be explained. I have provided an annular packing 17 surrounding connecting rod 16 which forms an air-proof seal between area 10a and the atmosphere and yet allows free reciprocation of rod 16 with respect to cylinder 10. Connecting rod 16 is provided with a longitudinal cavity as shown, to accommodate guide rod 18 which extends perpendicularly upward from the center of lower wall 11. The purpose of guide rod 18 is to insure the proper centering of piston 13 and prevent its binding with respect to the inner wall of cylinder 10.

Projecting downwardly from the lower wall 11 of cylinder 10 I have provided a connecting rod 20 which is adapted to terminate in a suitable pivotal connection as will be hereinafter explained.

Figure 2:
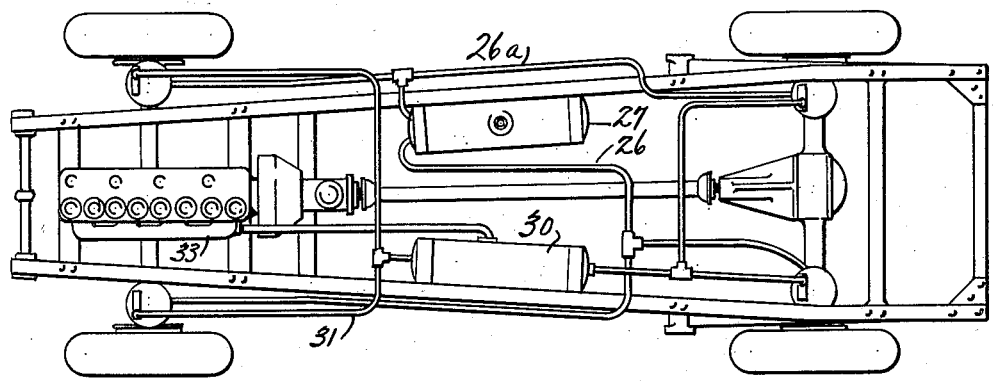

It is to be understood that the piston and cylinder arrangement previously referred to is merely one of a plurality of the same comprising my suspension system. As shown in Figure 2 one application of my suspension system is to provide four of said cylinders 10 mounted as shown, that is, at the several points at which the frame of the vehicle is over the axles of the same. As previously pointed out my suspension system may be either the sole suspension system used with the particular vehicle as will be pointed out in connection with Fig. 9 herein, or it may be used as an auxiliary to some other conventional suspension system such as a semi-elliptic spring as will be pointed out in connection with Fig. 10 herein. Whether my system is used independently or in conjunction with another system, the invention remains the same, as the only differences involved are those of strength, ruggedness, and other mechanical expedience.

Earlier in this description I have indicated that connecting rod 16 and connecting rod 29 terminate in suitable pivotal connections. The conventional ball and socket arrangement or shackle which is used on snubbers and shock absorbers is suitable for this purpose. The adaptation of my invention as disclosed herein contemplates connecting rod 16 as being connected to the frame and connecting rod 20 as being connected to the axle of the vehicle. Therefore, it is obvious, when a wheel of the vehicle strikes an obstacle the axle and frame are urged together in which event piston 13 approaches lower wall 11 of cylinder 10 and area 10b is decreased and area 10a increased. Similarly, when the wheel enters a depression in the road the distance between the axle and frame tends to increase, in which event piston 13 approaches upper wall 12 of cylinder 10 and area 10a is decreased and area 10b is increased.

As previously pointed out the purpose of my device is to prevent too rapid movement of the axle with respect to the frame of the automobile and to control said movement within predetermined limits.

Figure 3:
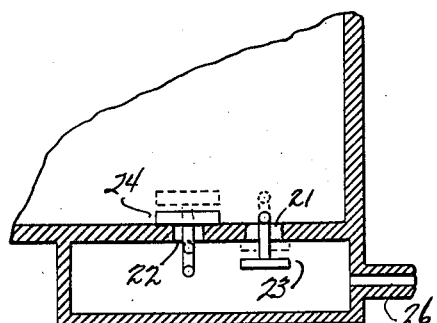
Figure 3 is a cross-sectional detail showing the check valves illustrated in Figure 1.
Figure 4:
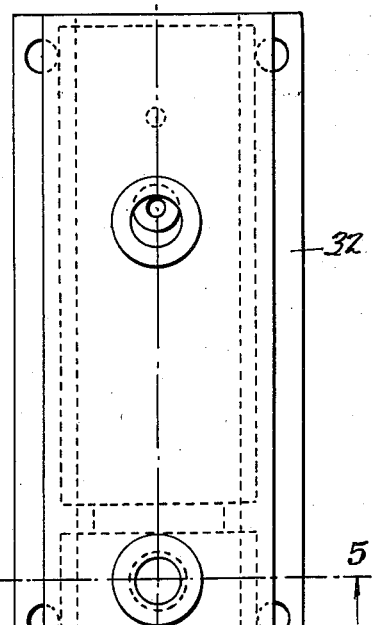
Figure 4 is a top plan view of the valve controlling the vacuum line of my device.

As shown in Figure 3, I have provided orifices 21 and 22 which are adapted to accommodate poppet valves 23 and 24 respectively. By virtue of orifices 21 and 22 and their associated valves, area 10b is connected through chamber 25 and conduit 26 to surge tank 27. Surge tank 27, which is vented freely to the atmosphere, is supplied with a quantity of oil which flows through conduit 26 and chamber 25 into area 10b within cylinder 10. It is obvious that movement of piston 13 within cylinder 10 either increases or decreases area 10b, and in the event area 10b is increased oil flows into area 10b from surge tank 27. In the event piston 13 moves downwardly and area 10b is decreased, oil flows from area 10b to surge tank 27. It will be noted that valves 23 and 24 are of a simple poppet type and are adapted to be operated by and to be responsive solely to differential pressure. For example, in Fig. 3, the valves as shown in full line position are adapted to allow the flow of oil from area 10b to surge tank 27, while the valves as shown in the dotted line position are adapted to permit flow in a reverse direction. It will be noted that orifices 21 and 22 are quite small in diameter and are designed to prevent too rapid flow of oil, and furthermore that orifice 21 is larger than orifice 22 whereby oil will tend to flow out of area 10b more rapidly than it will be drawn into area 10b. This will allow the distance between the axle and frame of the automobile to be decreased more rapidly than it may be increased, at least insofar as the device is controlled by the flow of oil in and out of cylinders 10.

The area 10a within cylinder 10 is connected to a source of vacuum 30 by conduit 31 and valve member 32. Vacuum within vacuum chamber 30 is created by connection to the intake manifold 33 of a conventional internal combustion gasoline engine. A vacuum of approximately 10 pounds per square inch will be developed within manifold 33 and the same will be sufficient for my purposes.

Valve 32 consists generally of a valve body 40 which is preferably cylindrical in shape and which communicates with the interior of cylinder 40 by means of orifices 41, 42 and 43. Within cylinder 40, I have provided a longitudinally movable piston 45 which has an annular groove 46 about its periphery, the purpose of which will be described hereinafter. Piston 45 is normally urged to the position shown in Figure 6 by virtue of spring 47, one end of which abuts against the adjacent end of piston 45 and the other end of which abuts against an annular collar 43 within cylinder 40. Valve 32 is connected to a source of vacuum through orifice 49 and conduit 31.

Cylinder 40 is vented to the atmosphere through orifices 50 and 57, the latter being controlled by a ball-check valve arrangement 58.

Within orifice 42, which is one of the orifices allowing communication between the inside of cylinder 40 and the area 10a, I have provided a poppet valve 65, which acts solely by virtue of differential pressure. There is no obstruction whatsoever in orifice 43 which also provides communication between cylinder 40 and area 10a of cylinder 10.

It is obvious that when piston 45 is in the position shown in Figure 6, communication is established between the source of vacuum 30 and area 10a by virtue of orifice 49, annular groove 46 and orifice 42. It is also obvious that when piston 45 is in the position shown in Fig. 7, such communication is cut off and communication is established between the atmosphere and area 10a by virtue of orifices 50 and 43. When piston 45 is in the postion shown in Fig. 6 communication between the atmosphere and area 10a through orifices 43 and 50 is cut off.

Figure 5:
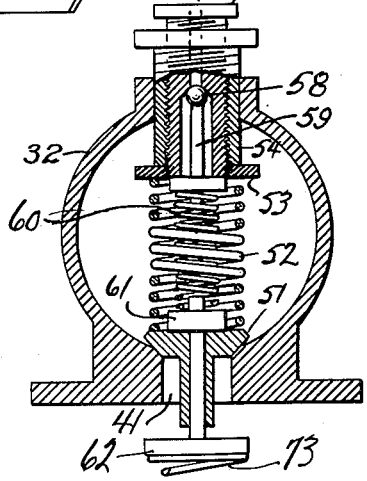
Figure 5 is a cross-sectional view taken along the line 5—5 of Figure 4.

In that portion of cylinder 40 remote from piston 45 I have provided another valve mechanism shown in cross-section in Fig. 5. As has previously been explained orifice 41 allows communication between area 10a and that portion of cylinder 40 remote from piston 45. Communication is interrupted or permitted by poppet valve 51 mounted within orifice 41. As shown in Fig. 5 valve 51 is closed and communication is interrupted. Valve 51 is normally urged to the position shown in Fig. 5 by spring 52, one end of which abuts against the upper surface thereof and the other end of which abuts against the lower abutment 53 on the lower end of threaded plug 54. Plug 54 threadedly engages the inner walls of orifice 55 and is adapted to be rotated therein thereby increasing or decreasing the tension of spring 52 upon the upper surface of poppet valve 51, resulting in an increase or a decrease in the pressure required to open the same. I have also provided a plug 56 threadedly mounted within plug 54 as shown. Longitudinal orifice 57 within plug 56 is adapted to be closed by ball check valve arrangement 58 which in turn is operated by push rod 59. Push rod 59 is urged by spring 60 to the position shown in Fig. 5, in which position it maintains ball check valve 58 in closed position and prevents communication between the interior of valve body 32 and the atmosphere through the orifice 57. The upper end of spring 60 abuts against push rod 59 and its lower end abuts against push rod 61. Push rod 61 is slidably mounted within poppet valve 51 and is provided at its lower end with a plate 62 to the lower side of which spring 73 is attached.

In the event a vacuum is created within that portion of cylinder 40 remote from piston 45, communication is allowed between that portion of cylinder 40 and the atmosphere by virtue of check valve 58, provided said vacuum is greater than the tension of spring 60.

Rotation of plug 54 either increases or decreases the tension upon spring 52 and either increases or decreases the amount of pressure required to be exerted by spring 73 to open poppet valve 51. Upward movement of piston 13 within cylinder 10 tends to compress spring 73 and by increasing or decreasing the resistance of spring 52, opening of poppet valve 51 may be hastened or delayed. In other words, I am able to predetermine the point to which piston 13 may rise before poppet valve 51 is allowed to open.

Likewise rotation of plug 56 either increases or decreases the tension of spring 60. It is desirable that when push rod 61 is at the position shown in Fig. 5 the tension of spring 60 be slight and permit communication to the atmosphere in the event there is any substantial vacuum within valve 32.

Therefore it is obvious that by properly adjusting the tension of springs 52 and 60 by rotation of plugs 54 and 56 respectively, I am able to control the sensitivity of valve 32 and to accommodate predetermined conditions.

Operation of valve 32 is generally as follows: When pressure is exerted from below on coil spring 73, that pressure is transmitted to push rod 61. Raising a push rod 61 compresses spring 60 and prevents the opening of ball-check valve 58. Furthere pressure on spring 73 is transmitted to valve 51 when plate 62 comes in contact therewith and valve 51 opens when this pressure exceeds the pressure of coil spring 52. Opening of valve 51 permits communication between the interior of cylinder 40 and area 10a. Release of pressure from spring 73 in turn allows the closing of valve 51 and cuts off communication between cylinders 10 and 40 through orifice 41. A further withdrawal of pressure from spring 73 allows push rod 61 to settle into the position shown in Fig. 5 thereby reducing the previously increased tension upon spring 60. Ball-check valve 58 normally remains closed and prevents communication between the atmosphere and the interior of cylinder 40 through orifice 57. However such communication is allowed when the vacuum pressure within cylinder 40 is greater than the pressure of coil spring 60 upon ball-check valve 58. At that time the check valve is opened and communication is established between the atmosphere and the interior of cylinder 40. When the pressure of spring 60 is again greater than the vacuum pressure within cylinder 40, ball-check valve 58 is closed and communication with the atmosphere is terminated.

Operation of all of the heretofore described parts as a unit is as follows: It will be assumed that suitable vacuum pressure of approximately 10 pounds per square inch has been created within vacuum tank 30. A suitable check valve arrangement may be placed in the conduit between intake manifold 33 and vacuum tank 30 to prevent the loss of vacuum in the event the vacuum pressure within the manifold is reduced. It will further be assumed that a supply of oil has been placed within surge tank 27, and that the surge tank is vented to the atmosphere. Prior to this time there has been no vacuum in the entire system and the control valve 32, and its component parts, including particularly piston 45, are in the position generally shown in Fig. 6 as spring 47 has urged piston 45 to the position there shown. The weight of the vehicle has forced piston rod 16 and piston 13 to a position at or near the bottom of cylinder 10, this position depending entirely upon whether or not the automobile is suspended entirely by my system or whether my system is an auxiliary to the conventional spring system. All or substantially all of the oil within chamber 10b has been evacuated therefrom into surge tank 27.

Source of vacuum 30 will be in communication with area 10a by virtue of orifice 49, annular groove 46 around piston 45 and orifice 42. It will be recalled that valve 65 in orifice 42 works solely by differential pressure and will normally be maintained in open position by virtue of the vacuum in tank 30 and the associated conduits. Area 10a will be evacuated and sufficient vacuum created to raise piston 13 from its position at or near the bottom of cylinder 10 to a position nearer the upper wall 12 of cylinder 10. Piston 13 will rise to a point at which it contacts and compresses spring 73 which will ultimately overcome the pressure of spring 60 thereby preventing opening of ball-check valve 58. Further compression of spring 73 will cause abutment 62 to contact the lower end of the stem of valve 51 and exert sufficient pressure thereon to overcome the resistance of spring 52. Valve 51 is thereby opened and vacuum within the area 10a and the area within valve 32 will draw piston 45 from the position shown in Fig. 6 to the position as shown in Fig. 7, and communication between the source of vacuum to area 10a is cut off. When this occurs, however, area 10a and the area within valve 32 will be in communication with the atmosphere through orifices 43 and 50 and piston 13 will settle in cylinder 10 thereby decreasing the pressure on spring 73 to a point at which the resistance of spring 52 will close valve 51. Some vacuum pressure will remain within valve 32 and spring 47 is so designed that this remaining vacuum will prevent spring 47 from returning piston 45 to the extreme position shown in Fig. 6. Rather piston 45 will be returned to a position intermediate the two extremes shown herein and communication with the atmosphere through orifice 43 and communication with the source of vacuum through orifice 42 will be cut off. The vacuum then remaining within area 10a will be "trapped" and will resist further downward movement of piston 13. Should, however, piston 13 settle to a point at which the pressure of spring 73 upon push rod 61 is overcome by the pressure of spring 60, push rod 61 will return to the position shown in Fig. 5 at which time the vacuum within valve 32 and acting against the face of piston 45 will overcome the resistance of spring 60 and will vent cylinder 32 to the atmosphere. At that time spring 47 will urge piston 45 to the position shown in Fig. 6 and the area 10a will again be in communication with the source of vacuum and will be urged upwardly to a position in which push rod 61 will be raised and valve 51 opened and the cycle repeated. Ultimately, however, assuming level road conditions the piston 13 will seek a position at which spring 73 is sufficiently compressed to overcome the resistance of spring 60 and maintain a slight vacuum within cylinder 32 yet spring 73 will not be compressed sufficiently to overcome the resistance of spring 52 and increase the vacuum within piston 32 upon piston 45.

From the above it is obvious that the so-called riding position of piston 13 within cylinder 10 may be controlled by varying the resistance of springs 52 and 60 and 73. For example if spring 73 is long and exceedingly flexible and a great deal of movement of piston 13 is necessary to overcome the resistance of spring 60, we shall have considerable movement of piston 13 without causing operation of valve 32. In the event, however, spring 73 is quite stiff and slight movement of piston 13 is required to overcome the pressure of spring 60, we will have an exceedingly sensitive valve 32. Those skilled in the art will appreciate the degrees of control possible and a further exploration of that subject is here considered unnecessary. When piston 13 rises, oil flows from surge tank 27 into space 10b below the piston 13 through orifice 21 and its associated valve 23 by virtue of the creation of differential pressure. It will be recalled that surge tank 27 is vented to the atmosphere so that the sole restriction upon the passage of oil into area 10b is the size of orifice 21. At this point the entire suspended weight of the vehicle is maintained by the vacuum created within the plurality of cylinders 10 which are mounted upon the vehicle as previously explained. When the vehicle is so suspended and is in motion on a highway, there are two things which may occur, (1) either a wheel of the device will strike an obstacle in which event the distance between the frame and axle will decrease, or, (2) the wheel of the device will enter a hole in which event the distance between the axle and the frame will increase.

Let the first of these conditions be assumed, that is, that the wheel strikes an obstacle. When the wheel of the vehicle or other device equipped with my suspension system strikes an obstacle, the distance between the axle and the frame tends to decrease and therefore piston 13 will tend to assume a position near the bottom of cylinder 10. There will be two forces tending to overcome this movement. First, the vacuum within area 10a, which will tend to prevent piston 13 from moving downwardly and, secondly, the oil within area 10b which will vent through orifice 22 and valve 24 back to surge tank 27. Downward movement of piston 13 will increase the vacuum pressure upon the upper surface of piston 13, in which event valve 65 will close. At this time the position of piston 45 will be as shown in Figure 6 and the area 10a above the piston 13 will be in communication with the source of vacuum. When the piston 45 is only moved from the position shown in Figure 6 upon upward movement of the piston 13 and opening of the control valve 32, closing of valve 65 however will be caused by the differential between the vacuum within the area 10a and the vacuum in the remainder of the line leading to the source of vacuum. Thus valve 65 constitutes an additional check against too rapid downward movement of the piston 13. The vacuum within area 10a will then increase in proportion to further downward movement of piston 13; that is downward movement will be resisted by progressively increasing pressure. In addition it should be pointed out that the oil will vent rather slowly through orifice 22 and any sudden movement will be dampened. Thus it will be seen that rapid decrease of the distance between the axle and the frame when the wheel strikes an obstacle will be prevented.

Let the second condition be assumed; that is, the wheel of the device has entered a hole, tending to increase the distance between the axle and the frame. When this takes place there is only one force tending to overcome the movement of the piston 13 toward the upper portion of cylinder 10, that is, the flow of oil from surge tank 27 to the area 10b through orifice 22 of valve 23.

Generally speaking, it may be stated that there are three conditions of the piston 13 which must be considered; the first condition being upward movement of the piston, the second condition being relatively stationary movement of the piston 13 at generally the position shown in Figure 1, and the third condition being downward movement of the piston 13 within the cylinder 10. Upon upward movement of the piston 13 within the cylinder 10 hydraulic fluid is allowed to enter the area 10b through the orifice 22 by virtue of differential pressure upon the valve 24. Differential pressure upon the valve 23 will cause it to close the orifice 21. Upward movement of the piston 13 will serve to compress the spring 73 and ultimately cause the opening of the valve 57 to communicate the vacuum within the area 10a with the area within the valve 40 adjacent the piston 45, thereby tending to urge the same to the left, as shown in Figure 6, when the effect of the vacuum is to overcome the spring 47.

Upward movement of piston 13 is not prevented, but is only slowed down by virtue of the passage of oil through orifice 21. In the course of an upward movement piston 13 will decrease the vacuum within area 10a and valve 32. In the event the vacuum upon piston 45 becomes less than the pressure of spring 47 piston 45 will assume the position shown in Fig. 6 and area 10a will again be in communication with the source of vacuum 30. This condition will be maintained until piston 13 started its downward stroke. When piston 13 begins its downward stroke poppet valve 65 in orifice 42 which, it will be recalled works solely by differential pressure and gravity, will close and downward movement of piston 13 will greatly increase the vacuum within area 10a and valve 32, thereby overcoming the resistance of spring 47 and drawing piston 45 to the position shown in Fig. 7 at which time area 10a will be in communication with the atmosphere through orifices 43 and 50. As the piston 13 moves downwardly the pressure of spring 73 upon the valve 57 will decrease, allowing valve 57 to close and terminate communication between the area 10a and the area within the valve 40 adjacent the piston 45. It will also be borne in mind that downward movement of the spring 73 will decrease the pressure of the spring normally holding the ball check valve 58 in the position shown in Figure 5 whereupon the effect of the vacuum upon the plunger holding the ball check valve 58 in the position shown in Figure 5 will operate on the same to unseat the ball check valve 58 and place the area within the valve 40 adjacent the piston 45 in communication with the atmosphere, whereupon the piston 45 is permitted to be urged to the position shown generally in Figure 6 by operation of the spring 47. Downward movement of piston 13 will be retarded solely by passage of oil through orifice 22 until such time as piston 13 has dropped to a point at which the decreasing pressure of spring 73 is overcome by springs 52 and 60 whereby the vacuum within valve 32 is vented to the atmosphere through orifice 57 and check valve 58 and the vacuum upon piston 45 is overcome by the resistance of spring 47 and piston 45 is returned to the position shown in Fig. 6 at which time area 10a is again in communication with the source of vacuum.

It has previously been stated to be one of the objects of my invention to adapt my device for controlling the sway on automobiles upon curves. It is well known to anyone who drives an automobile that an automobile when rounding a curve tends to lose its balance, that is, that side of the automobile towards the inside of the curve tends to rise while that side of the automobile on the outside of the curve tends to drop. As previously pointed out, it is an object of my invention to prevent the settling of the automobile on the outside of the turn.

As shown in Fig. 8 the device which I use to control a settling of one side of a car on a curve consists generally of a pendulum arrangement consisting of a weight 80 pivoted at point 81. Conduits 26 and 26a bleed oil from surge tank 27 to the cylinders 10 on the right and left hand sides of the vehicle respectively. Mounted in conduits 26 and 26a respectively I have placed a valve means 82 which is provided with orifice 83 and a valve seat 84. I have provided a reciprocating member 85, the ends of which are adapted to cooperate with valve seats 84 and stop the flow of oil from surge tank 27 through conduits 26 and 26a respectively. I have provided a pin 87 on weight 80 which is adapted to cooperate with vertical slot 88 in member 85. It is obvious that when member 80 is swung to the left, member 85 is likewise reciprocated to the left and end 86 thereof cooperates with valve seat 84 to prevent the flow of oil from surge tank 27 through orifice 82. Similarly, but not illustrated, swinging of pendulm 80 to the right causes member 85 to move to the right and similarly cut off flow of oil from tank 27 through conduit 26 to the cylinders 10 on the right hand side of the automobile.

Between surge tank 27 and conduits 26 and 26a I have provided a conventional ball-check valve generally illustrated at 90, consisting of ball 91 urged into position by spring 92. Ball-check valve 90 is to allow the passage of oil from surge tank 27 into the conduit 26a when the suction in conduit 26a is greater than the pressure exerted upon a ball 91 by spring 92.

Operation of this device may briefly be described as follows: Let it be assumed that the automobile is making a turn to the right. Centrifugal force will cause pendulum 80 to swing to the left, that is away from the turn, and force member 85 with its valve end 86 into valve seat 84 thus preventing the flow of oil from cylinders 10 on the left hand side of the car back to surge tank 27. This prevention of the flow of oil from conduit 26a is in reality a prevention of the flow of oil from area 10b. It will be realized that by preventing oil from flowing out of chamber 10b piston 13 will be prevented from dropping within the cylinder 10 and will therefore prevent the automobile from settling to the left hand or outside side. Should the automobile strike some object which tends to force the axle and frame together, the sudden increase in pressure in line 26 will overcome weight 80 and allow communication through orifice 84. I have also provided check valve 90 and spring 92, which spring 92 is sufficiently weak that should the wheel strike a hole and should more oil be required in space 10b, communication will be allowed between area 10b and surge tank 27 and the piston 13 will tend to rise within cylinder 10.

When the automobile is being operated on a sideling or high centered road, pendulum 80 will tend to maintain a vertical position regardless of the slant of the automobile. For example, should the car tilt to the right, pendulum 80 will maintain a vertical position, but this position will correspond to a swinging to the right or downhill side of the car with respect to the perpendicular axis of the car. Therefore tilting of the car to the right will cause pendulum 80 to close valve 82 in conduit 26 and thereby resist the flow of oil from cylinders 10 on the right or downhill side of the car into surge tank 27. This will resist settling of the car to the right or downhill side. Check valve 90 between surge tank 27 and conduit 26 will allow flow of oil from tank 27 to cylinders 10 should such flow be required as previously explained.

In Figs. 9 and 9a I have shown how my vacuum hydraulic device may be substituted for a conventional coil spring in an independent wheel suspension unit such as is used on certain types of automobiles. That type of suspension which I have illustrated is that commonly known as the link parallelogram in which the axle 100 is perpendicular to and rigidly connected with a vertical member 101. At its upper end member 101 is pivotally connected to a member 102 which in turn is pivotally connected to the frame of the vehicle. At its lower end member 101 is pivotally connected to a similar member 103 which is likewise pivotally connected to the frame of the automobile. In Fig. 9a a coil spring 104 of conventional design is placed between member 103 and the frame of the automobile in such a manner that the coil spring resists upward movement of member 103. Therefore it is seen that when the wheel of the device strikes an obstacle and tends to decrease the distance between member 103 and that portion of the frame of the automobile directly above it, spring 104 resists this movement. The above is well known to those skilled in the art and a further explanation is deemed unnecessary. As shown in Fig. 9, my vacuum hydraulic device may be substituted for coil spring 104. As has previously been explained this device will restrict both upward and downward movement of member 103 and therefore prevent too rapid vertical movement of the frame of the vehicle with respect to the wheel. The unit 105 illustrated in Fig. 9 is identical to the unit previously described herein and shown generally in Fig. 1. Its action is likewise controlled by vacuum from vacuum chamber 30 and by hydraulic fluid from surge tank 27. This device may also be controlled by the pendulum valve arrangement illustrated in Fig. 8.

In Fig. 10 I have shown my vacuum hydraulic suspension unit used in conjunction with conventional semi-elliptic springs. Semi-elliptic spring 110 is conventionally connected to frame 111 by shackles 112 and 113. In its normal conventional operation spring 110 prevents frame 111 from resting upon axle 114. However as is well known to those skilled in the art semi-elliptic springs as illustrated are subject to certain objections, and a snubbing or shock absorbing unit may advantageously be used in conjunction therewith. The vacuum hydraulic unit shown generally at 115 is the same unit previously described herein and generally illustrated in Fig. 1 of this specification. Its upper connecting rod is shown mounted to the frame at point 116 while lower connecting rod is shown permanently attached to the axle at point 117. The action of this unit 115 is identical with the action of similar units which has previously been explained herein, and the same acts as a snubbing or a shock absorbing element as has previously been described. It also may be used in connection with the pendulum valve arrangement generally illustrated in Fig. 8 hereof and previously described herein.

I claim:

1. In a vehicle suspension, a suspension cylinder, a suspension piston therein, a source of vacuum, a control valve periodically connecting one end of said suspension cylinder to said source of vacuum and to the atmosphere, said control valve comprising a cylinder and piston therein, a spring in said cylinder normally urging said piston toward a first position at one end of the cylinder, means in said one end of the cylinder for venting the suspension cylinder to the atmosphere upon movement of the piston to a second position removed from said one end, means in said piston and cylinder for connecting said source of vacuum to the suspension cylinder when the piston is at said first position, means including said piston for sealing the suspension cylinder from the atmosphere and from the source of vacuum when the piston is between said first and second positions, means at the other end of the cylinder for periodically connecting said other end to the suspension cylinder, said means comprising a valve and means connecting the valve to the suspension piston, the other end of said suspension cylinder containing liquid under atmospheric pressure and connected to the atmosphere through an orifice.

2. In a vehicle suspension, a suspension cylinder, a suspension piston therein, a source of vacuum, a control valve periodically connecting said one end of said suspension cylinder to said source of vacuum and to the atmosphere, said control valve comprising a cylinder and piston therein, a spring in said last named cylinder urging said control piston to one end, means in said end for venting the suspension cylinder to the atmosphere, said control piston shutting off said means when in said end and venting said means when removed from said end to a second position, additional means in said control cylinder for connecting the source of vacuum to the suspension cylinder when the control piston is in said one end, said connection being shut by the control piston when said piston is removed from said one end, said means being positioned within said cylinder so that the suspension cylinder is sealed from both the source of vacuum and the atmosphere when the control piston is in an intermediate position, means at the other end of the cylinder for periodically connecting said other end to the suspension cylinder, said means comprising a valve and means connecting the valve to the suspension piston, the other end of said suspension cylinder containing liquid under atmospheric pressure and connected to the atmosphere through an orifice.

3. In a vehicle suspension, a suspension cylinder, a suspension piston therein, a source of vacuum, a control valve periodically connecting one end of said suspension cylinder to said source of vacuum and to the atmosphere, said control valve comprising a cylinder and piston therein, means in one end of said cylinder for venting the suspension cylinder to the atmosphere, additional means in said cylinder for connecting said suspension cylinder to the source of vacuum, said control piston being adapted to alternately make either of said connections and to seal said suspension cylinder from both the source of pressure and the atmosphere, means at the other end of the cylinder for periodically connecting said other end to the suspension cylinder, said means comprising a valve and means connecting the valve to the suspension piston, the other end of said suspension cylinder containing liquid under atmospheric pressure and connected to the atmosphere through an orifice.

ORLEY R. STEPHENSON.

REFERENCES CITED

The following references are of record in the file of this patent:

UNITED STATES PATENTS

| Number | Name | Date |
|---|---|---|
| 770,128 | Teal | Sept. 13, 1904 |
| 837,086 | Lockett | Nov. 27, 1906 |
| 1,371,648 | Schmidt | Mar. 15, 1912 |
| 1,036,340 | Rockwell et al. | Aug. 20, 1912 |
| 1,664,510 | Hughes | Apr. 3, 1928 |
| 1,855,064 | Messier | Apr. 19, 1932 |
| 1,990,517 | Bedford et al. | Feb. 12, 1935 |
| 2,165,465 | Ehrhardt et al. | July 11, 1939 |
| 2,225,515 | Wood | Dec. 17, 1940 |

FOREIGN PATENTS

| Number | Country | Date |
|---|---|---|
| 3,659 of 1903 | Great Britain | Feb. 16, 1904 |